Nov. 3, 1936. E. POETER Re. 20,160
HANDBAG FRAME
Original Filed Oct. 24, 1931
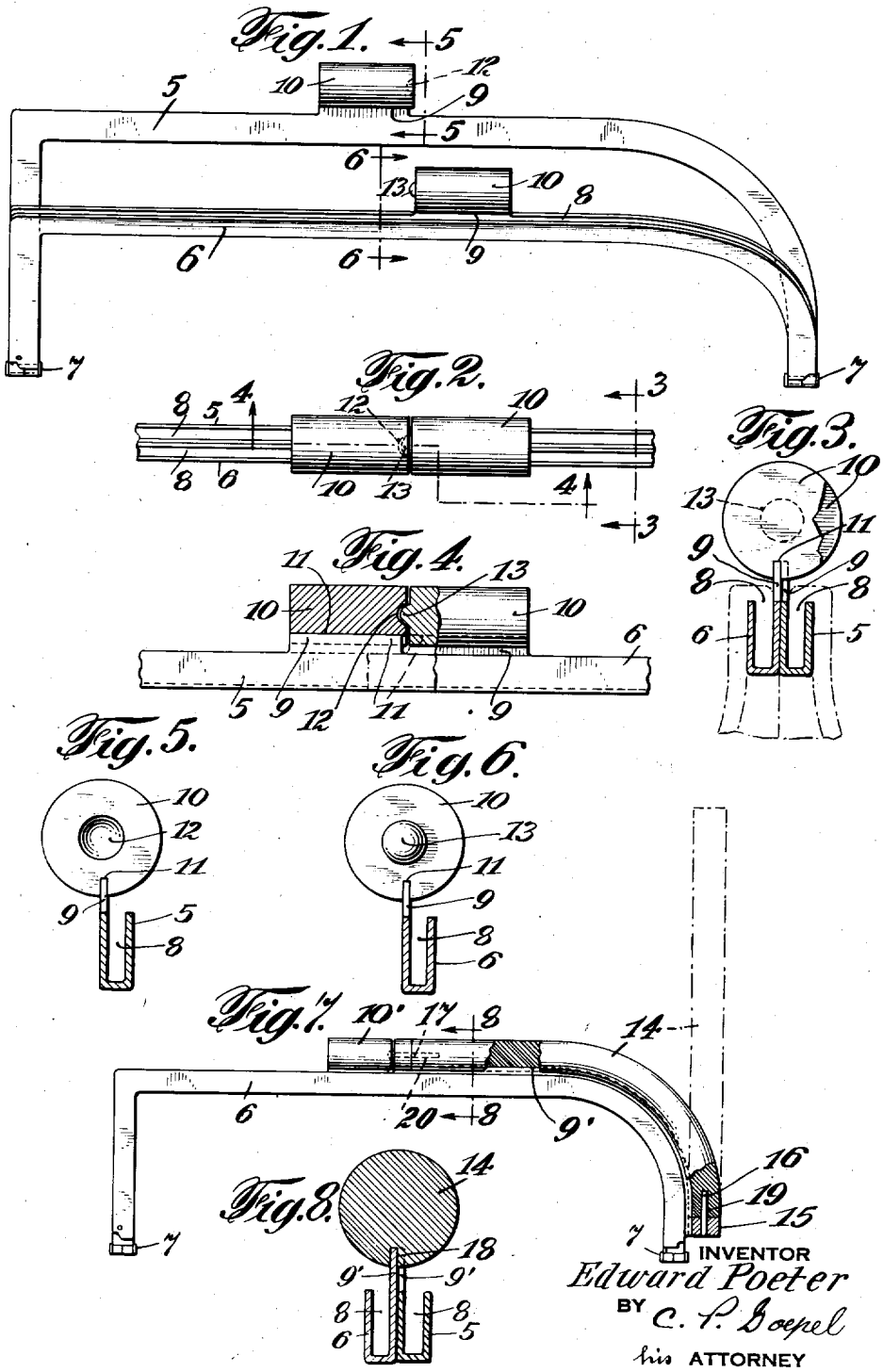
INVENTOR
Edward Poeter
BY C. P. Goepel
his ATTORNEY Reissued Nov. 3, 1936

Re. 20,160

UNITED STATES PATENT OFFICE 20,160

HANDBAG FRAME

Edward Poeter, Irvington, N. J., assignor to E. Poeter & Co., Irvington, N. J., a corporation of New Jersey Original No. 1,948,393, dated February 20, 1934, Serial No. 570,853, October 24, 1931. Application for reissue December 26, 1935, Serial No. 56,272

2 Claims. (Cl. 150—29)

This invention relates to handbag frames, and has for its primary object and purpose to provide a simple frame construction of the inverted channel type, whereby latch members may be easily and securely attached to the complementary frame members and in such relation to the open sides of the frame channels that the edges of the bag fabric may be easily inserted into said channels and secured in fixed relation to the walls thereof.

It is a more particular object of the invention to provide each of the bag frame members on its inner wall and in the plane thereof with an upstanding flange and a latch element having a groove receiving the edge of said flange and permanently secured in fixed relation therewith. It is a further object of the invention in one embodiment thereof to provide one or both of the frame members with means whereby an ornamental trim strip may be easily, quickly and securely attached thereto.

With the above and other objects in view, the invention consists in the improved handbag frame, and in the form, construction and arrangement of its several parts as will be hereinafter more fully described, illustrated in the accompanying drawing, and subsequently incorporated in the subjoined claims.

In the drawing wherein I have illustrated several simple and practical embodiments of the invention, and in which similar reference characters designate corresponding parts throughout the several views,—

Figure 1 is a side elevation of a bag frame, the frame members being illustrated in open position and showing one embodiment of my present invention;

Fig. 2 is a fragmentary top plan view;

Fig. 3 is a transverse sectional view taken on the line 3—3 of Fig. 2;

Fig. 4 is a longitudinal section taken on the line 4—4 of Fig. 2;

Fig. 5 is a detail section taken on the line 5—5 of Fig. 1;

Fig. 6 is a similar section taken on the line 6—6 of Fig. 1;

Fig. 7 is a side elevation of the bag frame having an ornamental trim strip applied to one of the members, and Fig. 8 is a transverse sectional view taken on the line 8—8 of Fig. 7.

Referring in detail to the drawing, 5 and 6 designate the two frame members which may be of any desired outline configuration, and are hingedly connected with each other at their corresponding ends in the usual manner as shown at 7. Each of these bag frame members is of the inverted channel shaped type now in wide use in the art in which the bag fabric or material extends over the outer sides of the frame members and has its edges turned inwardly and downwardly into the frame channels as shown at 8 in Fig. 3 of the drawing, to be fixedly held or secured therein by clinching the walls of the frame channels upon said material, as is the customary practice.

For the purpose of mounting suitable latch elements upon these bag frame members so that they may be securely latched together in closed position, and without in any way obstructing the frame channels in which the bag fabric is to be secured, I provide the inner wall at each frame member with an integral flange or extension 9 extending upwardly in the plane of said wall from the upper edge thereof. To the upper edge of each flange 9 a latch element 10 is flexdly secured. As herein shown, each of these latch elements consists of a cylinder of metal or other material of substantially the same length as the flange 9. However, it will be understood that said latch elements may be produced in an infinite variety of ornamental forms. Preferably, for the purpose of securing said elements to the flanges 9, I provide each latch element with a longitudinally extending groove or kerf 11 in which the upper edge of the flange 9 is tightly fitted. For the purpose of additional security in the connection, said latch elements may be welded or soldered to the flanges.

One of the latch elements 10 is provided in its end face with a suitable cavity or recess indicated at 12 to receive a correspondingly formed projection 13 on the opposing end face of the other latch element. Thus, when the two frame members are brought together in closing the bag, the projection 13 rides over the end face of the opposing latch element and thereby shifting the frames slightly in longitudinally opposite directions until said projection snaps into the recess or cavity 12. There is sufficient relative yielding between the frame members at the hinge connection 7 to permit of this slight displacement between the frame members as they are latched together. Similarly, when it is desired to open the bag, by applying transverse pressure against the elements 10 in relatively opposite directions, the frame members will yield longitudinally as the projection 13 rides over the end face of the latch element having the recess 12 therein.

It will be noted from reference to Fig. 3 of the drawing, that after the latch elements have been secured to the upper edges of the flanges 9, they are sufficiently spaced above the upper edges of the walls of the frame member to permit the edges of the bag fabric to be readily turned inwardly and inserted into the frame channels. It will be understood that the flanges 9 are rigid and do not yield with respect to the channel walls so that in the operation of the latching means, the inner walls of the channels are not displaced relative to the fabric.

In Figs. 7 and 8 of the drawing, I have shown in addition to the latch elements 10′ attached to the respective frame members as above described, an ornamental trim strip 14 secured to one of said frame members. This frame member has the upstanding flange 9′ on its inner wall extending continuously from the latch element 10′ to one end of the frame. At this latter end of the flange 9′, the metal member or disc 15 is attached thereto in a manner similar to the attachment of the latch element 10′ and is provided with a projecting pin 16. The latch element 10′ on this frame member also has a pin 17 fixed therein and projecting from one side of said latch element, and this pin may be conveniently provided with a head at one end at the opposite side of the latch element to coact with the complementary latch element on the other frame member in a similar manner to the projection 13 as above described.

The trim strip 14 extends between the member 15 and the latch element 10′, and is formed from a composition material, which under the application of heat, may be easily flexed or bent and shaped to a desired form. This strip is provided on one side thereof with a continuous longitudinally extending groove 18 to receive the edge of the flange 9′ and at each of its ends has a short axially extending bore as indicated at 19 and 20 respectively.

In applying the trim strip 14, one end of the flange 9′ is first fitted into one end of the groove 18 in said strip and the upstanding pin 16 on member 15 is engaged in the bore 19 of the strip. This strip is then heated sufficiently to enable the same to be bent inwardly and downwardly so that the pin 20 may be fitted into the bore at the opposite end of the strip, while the flange 9′ is received in the groove 18. As the trim strip 14 then cools and contracts, it becomes tightly and immovably fixed with relation to the pins 19 and 20 and the flange 9′. Of course, it will be understood that a trim strip might likewise be applied in a similar manner to the other bag frame member, if desired.

From reference to Fig. 3 of the drawing, it will be noted that since when the bag frame is closed, the flanges 9 are disposed in different parallel planes, in order that the latching members or knobs 10 may be accurately aligned with their peripheral surfaces flush with each other, said members are slightly offset in opposite transverse directions out of radial alignment with the flanges 9. Thus, the latch means when the bag is closed, will present a very attractive and ornamental appearance.

It will be noted that the flange heretofore referred to forms a tab, and that in the embodiment shown there is a bag frame having complementary frame members with parallel walls forming a U-shaped channel adapted to be placed in parallelism and having the adjacent walls forming the inner walls substantially in contact with each other, and with the ends of the bag fabric passing over the outer walls of said adjacent channels, the combination of an extension on each inner wall forming parts thereof and flush with the planes of the side faces of said wall forming a longitudinally disposed tab projecting outwardly of the frame beyond the edge of the remaining portion of said wall, the tab of one wall being disposed in juxtapositioned alignment to the tab of the adjacent inner wall, each tab is of elongated shape extending along the frame and a fastening member on each tab having an elongated longitudinal groove securingly engaged by said tab and of substantially the same length as the tab, and extending laterally beyond the tab over the overhanging bag material in the frames in nonobstructing relation thereto, and each having a cooperative locking device, and also, each fastening member is offset in respect to its tab and in longitudinal alignment with its adjacent member, with the ends of the members facing each other, and with a cooperative locking device on each adjacent end of the fastening members.

From the above description and the accompanying drawing, the several novel features of my improved handbag frame will be clearly understood. It will be seen that by reason of the means which I have provided on the frame members for the attachment of the latch knobs or elements thereto, its is possible to provide such latching knobs in a great variety of unusual and highly ornamental forms in connection with a bag frame of this type without obstructing the open sides of the frame channels or interfering with the easy and quick insertion of the edges of the bag fabric therein. Also the latch elements and the trim strip 14 may be made from various materials presenting a harmonious and ornamental contrast with the material or fabric from which the body of the bag is made.

I have herein shown and described several desirable and practical embodiments of my present improvements, which, however, as to the essential features thereof might also be incorporated in various other alternative structural forms, and I accordingly reserve the privilege of resorting to all such legitimate changes therein as may be fairly embodied within the spirit and scope of the invention as claimed.

I claim:

1. In a bag frame having complementary frame members with parallel side walls forming a U-shaped channel adapted to be placed in parallelism and having the adjacent walls forming the inner walls substantially in contact with each other, and with the ends of the bag fabric passing over the outer walls of said adjacent channels, the combination of an extension on each inner wall forming part thereof and flush with the planes of the side faces of said wall forming a longitudinally disposed tab projecting outwardly of the frame beyond the edge of the remaining portion of said wall, the tab of one wall being disposed in juxtaposition and parallel to the tab of the adjacent inner wall, and a fastening member on each tab having a longitudinal groove securingly engaged by said tab, and extending laterally beyond the tab over the overhanging bag material in the frames in nonobstructing relation thereto, and each fastening member being offset in respect to its tab and in longitudinal alignment with its adjacent member, with the ends of the members facing each other, and a cooperative locking device on each adjacent end of the fastening members.

2. In a handbag frame, opposite frame sections consisting of U-shaped channels having outer walls over which the bag fabric can pass for securement in the adjacent channels and having parallel inner walls, a longitudinal member on each inner wall integrally joined thereto along its lower longitudinal side edge, a finger grip directly engaged with and extending along the upper longitudinal side edge of each longitudinal member and overhanging the inner face as well as the outer face thereof and the adjacent channel of the section, said longitudinal members with their grips being out of alignment transversely of the sections and the inner end faces of said grips being adjacent one another to permit closing full face contact of the inner sections, said members extending from their inner adjacent longitudinal ends in opposite directions along their respective sections.

EDWARD POETER.